United States Patent [19]
Groos

[11] Patent Number: 5,199,162
[45] Date of Patent: Apr. 6, 1993

[54] METHOD FOR THE MANUFACTURE OF A WIRE-ELECTRODE FOR SPARK-EROSIVE CUTTING

[75] Inventor: Heinrich Groos, Herborn, Fed. Rep. of Germany

[73] Assignee: Berkenhoff GmbH, Heuchelheim, Fed. Rep. of Germany

[21] Appl. No.: 738,528

[22] Filed: Jul. 31, 1991

Related U.S. Application Data

[62] Division of Ser. No. 629,236, Dec. 18, 1990, Pat. No. 5,140,125.

[30] Foreign Application Priority Data

Dec. 22, 1989 [DE] Fed. Rep. of Germany ....... 3942604

[51] Int. Cl.⁵ .......................................... H01R 43/00
[52] U.S. Cl. ...................................... 29/825; 57/212; 57/213; 57/222; 439/85
[58] Field of Search ................. 29/825, 878; 140/149; 57/12, 13, 6, 212, 213, 215, 216, 222, 223, 236; 439/85

[56] References Cited

U.S. PATENT DOCUMENTS

| | | | |
|---|---|---|---|
| 2,359,090 | 9/1944 | Dyer, Jr. | 57/212 X |
| 2,604,883 | 7/1952 | D'Avaucourt | 140/149 X |
| 3,271,724 | 9/1966 | Brieger et al. | 29/878 X |
| 3,852,878 | 12/1974 | Monroe | 439/85 X |
| 4,580,545 | 4/1986 | Dorsten | 140/149 X |
| 4,776,160 | 10/1988 | Rees | 57/212 X |

FOREIGN PATENT DOCUMENTS 61-136732 6/1986 Japan.

Primary Examiner—Carl J. Arbes
Attorney, Agent, or Firm—Flynn, Thiel, Boutell & Tanis

[57] ABSTRACT

A wire-electrode arrangement for effecting a spark-erosive cutting and a method for the manufacture of a wire electrode. In order to be able to cut non-conductive materials, a plus potential and also a minus potential can be applied to the electrode, since the wire electrode is formed by a first and a second electrode, which are insulated from one another and which extend substantially parallel to one another.

7 Claims, 4 Drawing Sheets

METHOD FOR THE MANUFACTURE OF A WIRE-ELECTRODE FOR SPARK-EROSIVE CUTTING

This is a division of U.S. patent Ser. No. 07/629,236, filed Dec. 18, 1990 now U.S. Pat. No. 5,140,125 issued Aug. 18, 1992.

FIELD OF THE INVENTION

The invention relates to a method for the manufacture of a wire-electrode for spark-erosive cutting.

BACKGROUND OF THE INVENTION

During the spark-erosive cutting of conducting materials the effect is utilized that between the electrode and the material to be cut exists a voltage potential leading to sparkovers which are used for the purpose of removing the material area to be cut. Such methods are known from the stare of the art.

Since according to the common principles of spark-erosive cutting a potential must be applied to the workpiece, problems result, because of the basic principle, with workpieces which are not electrically conductive.

DE-PS 26 37 432 describes a method and an apparatus for cutting nonconducting or poorly conducting workpieces, for example diamonds. Two wire electrodes which are parallel to one another are hereby utilized. These are designed plate-shaped and their spacing is chosen such that a sparkover between the two electrodes occurs. The spark length is thereby controlled such that the nonconducting or poorly conducting material, which is to be cut, is eroded. This operation has the decisive advantage that a very exact guiding of the two electrodes is needed. This is particularly disadvantageous in view of the fact that the electrodes are designed as wire electrodes and must at all times be guided. Another disadvantage of this operation is that the available erosion path is only very short, since the sparkover occurs only between the two wire electrodes. If for structural reasons a wider cutting width or rather a greater spacing between the two electrodes is necessary, very high voltages must be applied in order to achieve the desired effect.

Another possibility for a solution to the basic problem, which solution is for example known from DE-PS 24 04 857, is to form a surface-active substance in the dielectric solution through a suitable preparation of the electrolytic solution, which dielectric solution results in a certain conductivity of the respective surface area and is supposed to effect a sparkover from the electrode to the nonconducting or poorly conducting workpiece. This operation requires a considerable effort in the preparation or the monitoring of the electrolytic solution and is thus not suited for many industrial uses.

The basic purpose of the invention is to provide a method for the manufacture of a wire-electrode for spark-erosive cutting which with a simple design and a simple application facilitates a spark-erosive cutting of non-conducting materials.

Regarding the method, the basic purpose is attained by an insulated wire forming the first electrode being profiled in a first embodiment, by the second electrode being introduced in the form of an insulated wire into the coil or helix during the coiling operation of the profiled wire, and by areas of the insulating layer of the second electrode being removed during a subsequent passage through a wire shaving nozzle. Thus, it is for example possible to utilize the insulated wire material in the form of an enameled wire of copper, Ne-metal alloys, iron and steel or other conductive material. The electrode wire is profiled for example by rolling or drawing with the enameled layer not being damaged when conventional methods are used. One or two additional bare noninsulated wires are also introduced into the twist or helix during the twisting operation in dependency of the desired development of the electrode. The enameled layer on the outer contact or rather spark-discharge surface of the first electrode is again removed by means of the shaving nozzle so that a spark transfer between the individual electrodes is made possible. It is to be understood that the number of the individual wire electrodes both in this exemplary embodiment and also in the other exemplary embodiments can be chosen as desired in order to produce the desired spark lengths.

A further, preferred method development provides that several wires, of which at least one is insulated, are guided through a twisting or helical path, and that by means of a wire shaving nozzle the insulating layer is removed on the outer area of the wire electrodes. A central insulator is formed during this operation, which insulator consists of the two insulating layers of the individual insulated wires, which insulating layers rest on one another It is thereby possible to use in a particularly economical manner enameled wires of a normal copper wire or corresponding wire. The design of the wire shaving nozzle makes it possible to remove the insulation or the enameled layer at specific peripheral areas of the wire electrode in order to create the desired discharge zones. In order to improve the engagement characteristic of the wire electrode with the corresponding sliding electrode and in order to safely guide the wire electrode, it can be advantageous that the wires are profiled before or after the twisting. Thus, it is for example possible to use segment wire or semicircular wires or to provide the wire with a prismatic cross section.

As an alternate to the last described operation, it is also possible to construct the wires as semicircular wires with at least one of the wires being insulated or rather enameled. It is thereby possibly advantageous to glue the two wires together, for example during an enameling method during a simultaneous heating up of the wires.

In a modification of the method, it can be advantageous when an insulated wire is twisted and a soft material with a low melting point is thereafter introduced into the helix formed by the twist. The respective outer surface of the wire electrode can have its insulation removed also by a wire shaving nozzle. The insulated wire can be for example a profiled wire having a temperature-resistant lacquer, plastic, Teflon or non-conducting aluminum oxide. The metal introduced into the helix can consist for example of lead, tin, zinc or corresponding alloys or can be produced through a suitable application method, as for example hot-tin plating and zinc plating or others.

Thus, the invention creates the possibility of eroding nonconducting materials, in particular ceramics. Of course, the man skilled in the art knows that the wire electrode of the invention can be designed of two or more individual wire-shaped electrodes. Furthermore, it is possible to design the wire electrode as a continuous electrode or as a laced electrode.

BRIEF DESCRIPTION OF THE DRAWINGS

The invention will be described hereinafter in connection with exemplary embodiments and the drawings, in which:

FIG. 2A is a cross-sectional view of the wire shown in FIG. 2;

DETAILED DESCRIPTION

Figure 1:
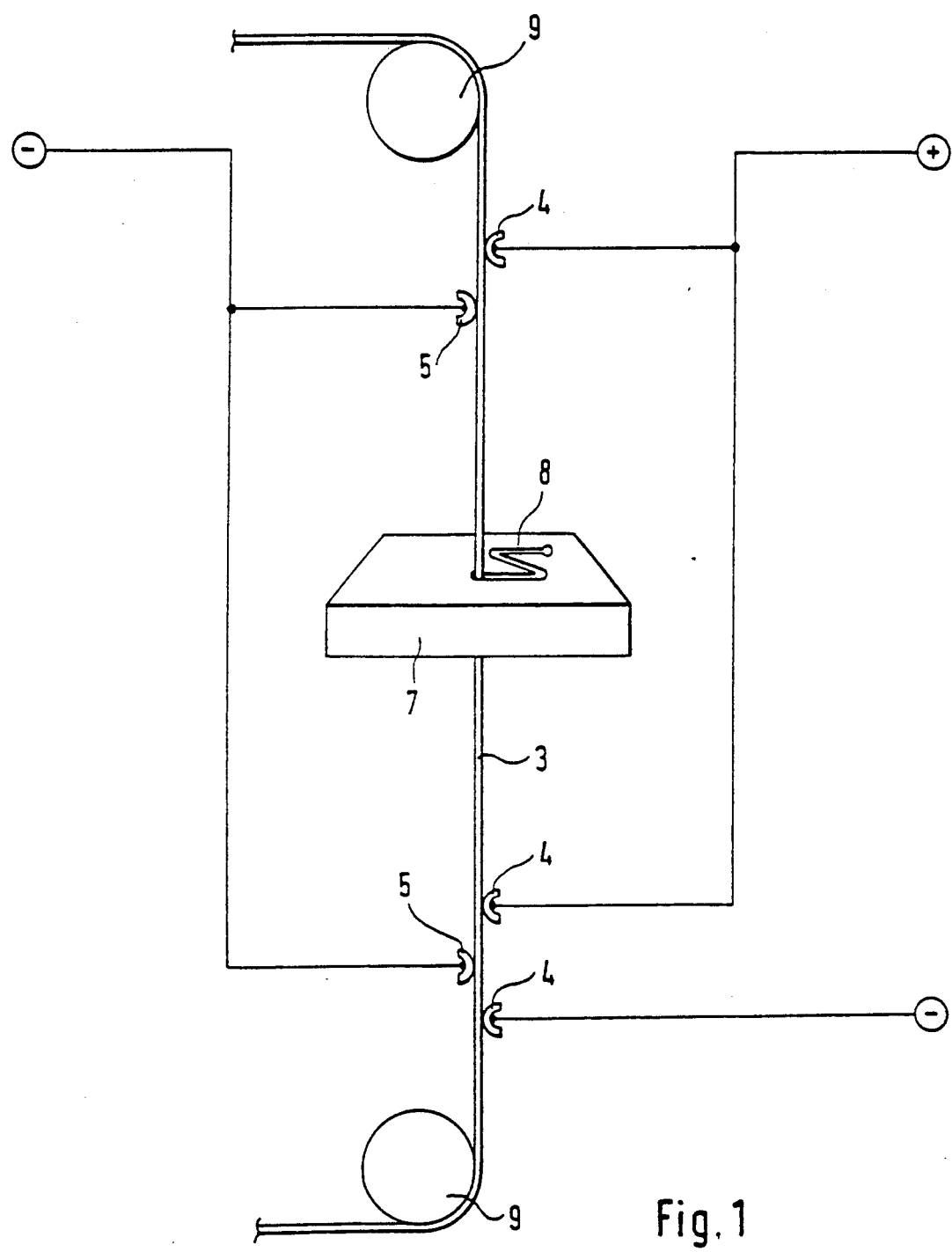
FIG. 1 is a schematic illustration of the spark-erosive cutting arrangement.

FIG. 1 shows a schematic illustration of the spark-erosion arrangement of the invention. It includes a workpiece 7 made of a nonconducting material and which has a cutting groove 8 therein. The entire arrangement is in the usual manner, at least in the spark-erosion area, arranged in a dielectric, as this is known from the state of the art. A wire electrode 3 is guided through the workpiece 7, which wire electrode 3 is guided in a manner not illustrated from a storage spool onto a wind-up spool. FIG. 1 shows of the entire wire guide system only the guide rollers 9.

Sliding contacts 4, 5 are provided in front of or rather after the workpiece 7 in the arrangement according to FIG. 1, by means of which sliding contacts the wire electrode 3, which will be described hereinafter, is to be connected to a plus potential or, and in the alternative, a minus potential. The sliding contacts 4 are used to provide the connection to the plus potential, while the sliding contacts 5 are used to provide the connection to the minus potential.

Figure 2:
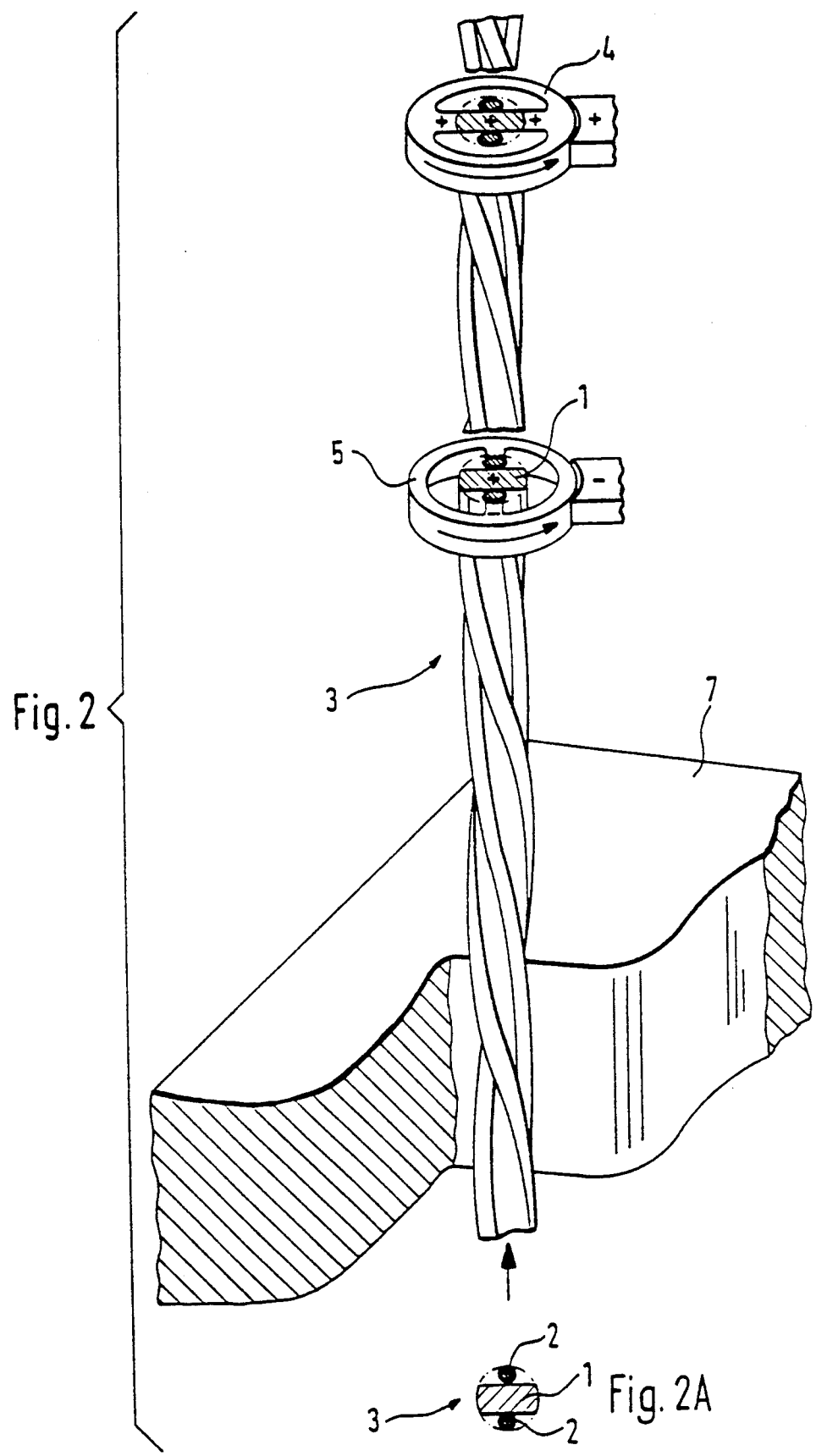
FIG. 2 is a schematic, perspective view of a first exemplary embodiment of the arrangement of the invention.

FIG. 2 shows an enlarged perspective illustration of a workpiece 7, partly in cross section, which is being cut by means of the wire electrode 3. FIG. 2A shows a cross section of the illustrated exemplary embodiment of the wire electrode 3. The design of the wire electrode will be discussed in detail hereinafter in connection with FIG. 4. The wire electrode includes a first electrode 1, which is centrally arranged. Second electrodes 2 are each provided on the two flanks of the electrode. The second electrodes 2 are insulated from the first electrode 1 by means of an insulating layer 10. The entire wire electrode 3 has a substantially circular cross section and is designed such that the insulating layer 10 of the second electrode 2 is removed on the outer peripheral area. A spark length can in this manner be created from the second electrode 2 to the bare, not insulated first electrode 1.

Figure 3:
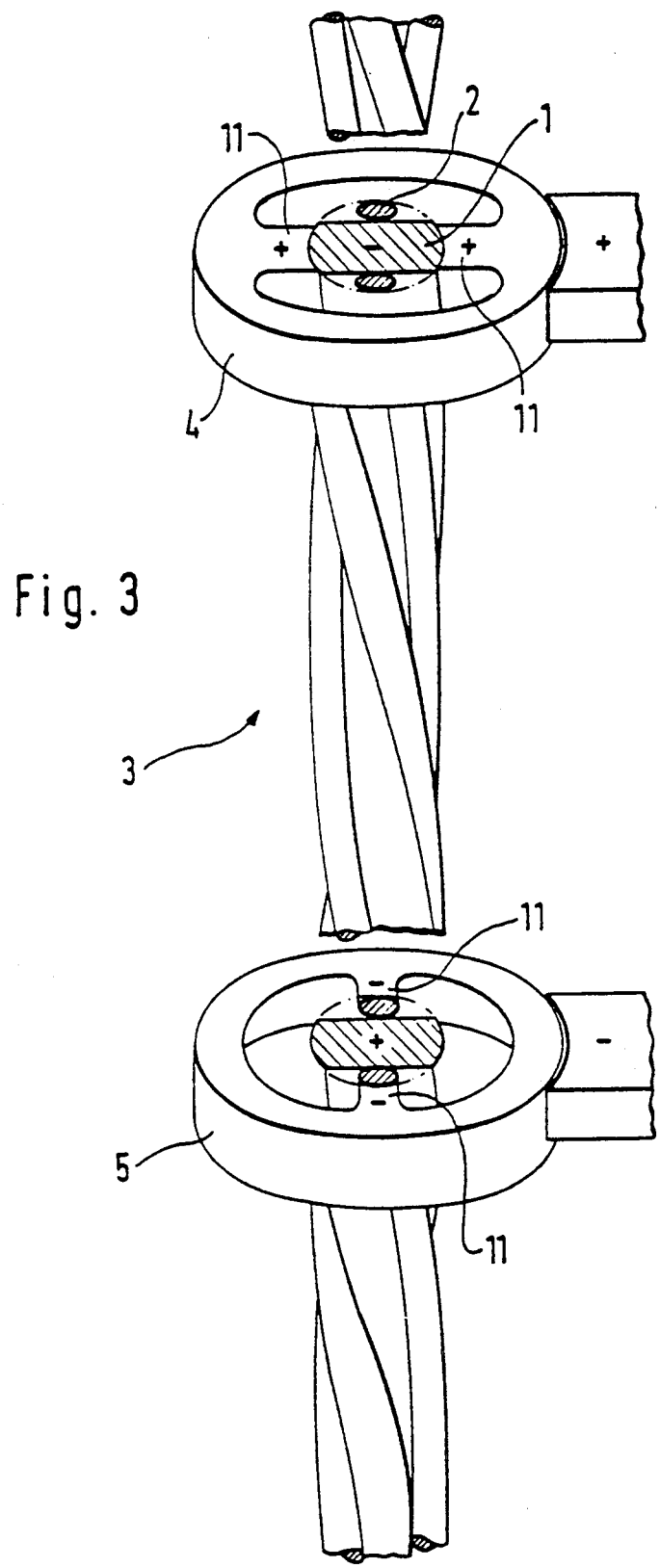
FIG. 3 is an enlarged illustration of the sliding contacts used in the arrangement according to FIG. 2.

FIG. 3 is an enlarged illustration of the design and of the arrangement of the wire electrode 3.

According to the invention, the possibility exists to use different materials for the first and the second electrode, which materials can be adapted with respect to their electrical characteristics, their wear resistancy and other values in an optimal manner to the requirements.

Figure 4:
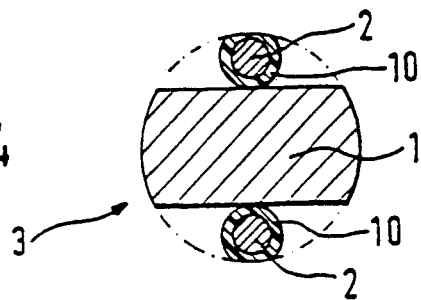
FIG. 4 is a cross-sectional view of an exemplary embodiment of the wire electrode of the invention with a central electrode.

To transmit the electrical potential, the exemplary embodiment of the wire electrode shown in FIGS. 2–4 illustrates an annular sliding contact 4, 5 enclosing the wire electrode 3 and having diametrically opposing, inwardly extending legs 11 adapted to the profiling of the wire electrode 3 and dimensioned such that they engage the first or rather the second electrode 1, 2. The sliding contact 4 illustrated in the upper area of FIG. 3 is used for the application of a plus potential, while the lower sliding contact 5 applies a minus potential. As indicated by the arrows in FIG. 2, the sliding contacts 4, 5 rotate in order to maintain during a longitudinal movement of the coiled or helical wire electrode 3 a contact with the respective electrode 1 or 2. To adapt the rotary movement of the sliding contact 4, 5, it is possible to profile the respective electrode or rather the sliding contact in order to assure a power transmission, as this is shown in the exemplary embodiments of FIGS. 5 and 6.

Figure 5:
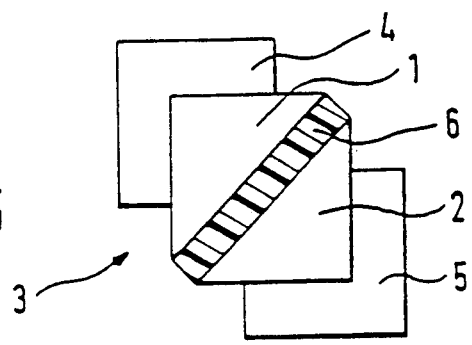
FIG. 5 is a cross-sectional view of an exemplary embodiment of the wire electrode of the invention illustrating the sliding contacts, with a central insulating member.
Figure 6:
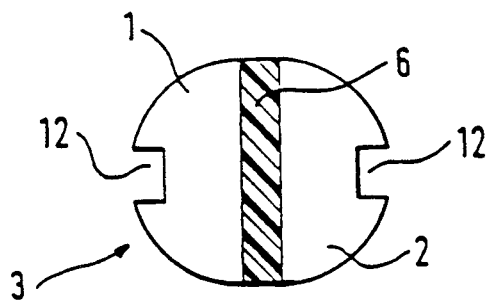
FIG. 6 is a cross-sectional view of a further modified development of the wire electrode of the invention.

FIGS. 5 and 6 each show exemplary embodiments of the wire electrode of the invention, in which a central insulator 6 is provided which electrically insulates the first electrode 1 from the second electrode 2. The two electrodes 1, 2 each have a profiled design, with the electrode of the exemplary embodiment of FIG. 5 having a prismatic or triangular cross section, while the electrode 1, 2 according to the exemplary embodiment of FIG. 6 having a semicircular cross section with a groove 12 in its apex. The groove 12 serves to facilitate the form-closed engagement with a correspondingly profiled sliding contact (not illustrated). The exemplary embodiment according to FIG. 5 shows a cross-sectional illustration of the sliding contacts 4, 5. The sliding contacts 4, 5 are designed angularly and enclose the outer surface of the electrode 1 or 2. It is to be understood that the sliding contacts 4, 5 illustrated in FIG. 5 form only a portion of the annular design, as it is shown in FIG. 3.

The invention is not to be limited to the illustrated exemplary embodiments. Rather many possibilities for modifications within the scope of the invention exist for the man skilled in the art.

The embodiments of the invention in which an exclusive property or privilege is claimed are defined as follows:

1. A method for the manufacture of a wire electrode, comprising the steps of:

twisting a first wire forming a first electrode;

introducing, during said twisting step, a second wire forming a second electrode into a helix formed in said first electrode during said twisting step, at least one of said first and second electrode wires having an insulation thereon electrically isolating said first and second electrode wires from one another; and thence removing a selected radially outermost part of the insulation from said one of said first and second electrode wires to expose the wire of said one of said first and second electrodes.

2. The method for the manufacture of a wire electrode according to claim 1, wherein at least one additional wire forming an additional electrode is introduced during said twisting step into a further helix formed in said first electrode during said twisting step, and wherein only a radially outer part of the insulation is removed in order to maintain the electrical isolation between the electrodes.

3. The method according to claim 2, wherein the wires are shaped into a specific profile before the twisting step.

4. The method according to claim 2, wherein the wires are shaped into a specific profile after the twisting step.

5. The method according to claim 4, wherein said insulation is on one of the wires, wherein said method further comprises the step of twisting the insulated wire to form a helix, introducing a second wire of a soft material with a low melting point into the helix, and wherein thereafter the insulation on an outer surface area of the wire is removed while retaining the electrical isolation between the wires.

6. A method for the manufacture of a wire electrode, comprising the steps of:
   orienting at least a pair of bare wires side-by-side along a length thereof;
   orienting insulation between the wires;
   orienting bare parts of the wires to face radially outwardly away from the insulation; and thence
   securing the wires and the insulation together so that the insulation electrically isolates the wires from one another;
wherein the wires are designed as semicircular wires.

7. A method for the manufacture of a wire electrode, comprising the steps of:
   orienting at least a pair of bare wires side-by-side along a length thereof;
   orienting insulation between the wires;
   orienting bare parts of the wires to face radially outwardly away from the insulation; and thence
   securing the wires and the insulation together so that the insulation electrically isolates the wires from one another;
wherein the wires are adhesively secured to one another.

* * * * *